(No Model.)

W. D. RUMSEY.
VEHICLE SPRING.

No. 462,330. Patented Nov. 3, 1891.

WITNESSES
D. W. Bradford
F. Clough.

INVENTOR
William D. Rumsey.
By Yelk & Leggett,
Attorneys.

UNITED STATES PATENT OFFICE.

WILLIAM D. RUMSEY, OF DETROIT, MICHIGAN.

VEHICLE-SPRING.

SPECIFICATION forming part of Letters Patent No. 462,330, dated November 3, 1891.

Application filed April 30, 1891. Serial No. 391,079. (No model.)

*To all whom it may concern:*

Be it known that I, WILLIAM D. RUMSEY, a citizen of the United States, residing at Detroit, county of Wayne, State of Michigan, have invented a certain new and useful Improvement in Vehicle-Springs; and I declare the following to be a full, clear, and exact description of the same, such as will enable others skilled in the art to which it pertains to make and use the same, reference being had to the accompanying drawings, which form a part of this specification.

Figure 1:
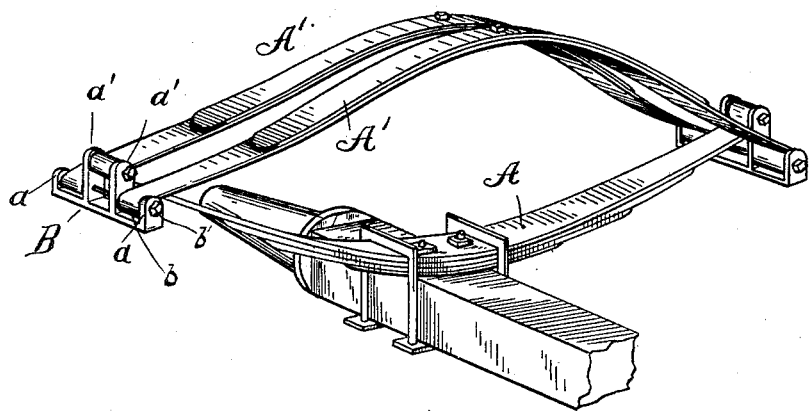
Figure 2:
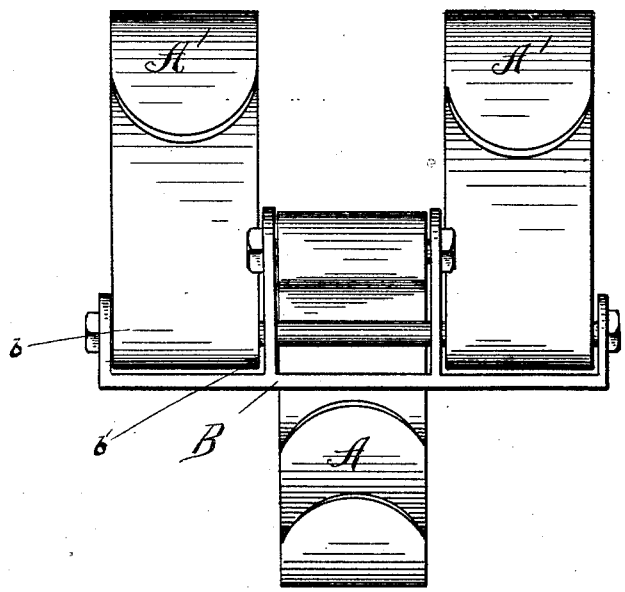

Figure 1 is a view of a vehicle-spring constructed according to my invention. Fig. 2 is a view of the link-coupling or vibrating hanger connecting the springs.

It has been found desirable in connection with vehicle-springs to so attach the body to the springs that a swinging or vibrating motion may be permitted in the body of the vehicle. This has usually been accomplished by suspending the body from the springs on links or by suspending the body from a frame by links and the frame resting on springs. In the case of road-carts the link connection has been used to allow a certain longitudinal vibratory movement to the body to overcome horse motion, and in some cases universal links have been used to permit the vibratory motion both longitudinal and lateral. Links have been used with elliptical springs to overcome horse motion and with transverse elliptical springs to permit lateral motion. In addition to overcoming horse motion in carts, the vibratory motion avoids sudden jerks in case of four-wheeled vehicles due to sudden starting or stopping of the vehicle and avoids sudden strain on the springs in such cases.

I am aware that links have been connected with elliptical springs in many forms, but I am not aware that elliptical springs have ever been used in which the links have been placed between the upper and lower sections of the springs, whereby one section is allowed a vibratory or reciprocating movement relative to the other section. The difficulty of securing such an arrangement has probably arisen from the fact that elliptical springs have been usually compression-springs rather than extension-springs, and such a construction does not permit the introduction of a loose link that will permit reciprocating movement. Another difficulty to overcome in introducing the link between the sections of the spring is the balancing or supporting of the spring under the strain necessarily incident to its use. I overcome these difficulties by introducing the link in an elliptical spring, in which two springs are used to constitute one section (either the upper or the lower) and a single spring the other section. I am aware that springs of this kind have been used, notably shown in patents of Kitzmiller, No. 266,842, dated October 31, 1882, and Hayes, No. 398,156, dated February 19, 1889. The objects usually to be accomplished in the use of this class of spring have been to avoid the sections of the spring coming together on the extreme depressions of the spring. By using a link or depending shackle I am able to place the outer extremity or the coupling end of the lower section of the spring above that of the upper section and make a suspension-spring from or in an elliptical spring, and allow the upper section to reciprocate over the lower section to accomplish the purposes achieved where the link is outside of the spring.

In the drawings, A is the single section of a full elliptic spring of the class mentioned, and A' A' the double section.

B is a hanger pivoted to the two springs $b$ $b$ by the bolt $b'$, passing through the whole hanger. This hanger is provided with a short ear $a$ at each end and two long ears $a'$, centrally located. The springs of the double section are embraced by one of the short ears $a$ and one of the long ears $a'$, while the single section is pivoted between the long ears and at their extreme outer ends. This converts the hanger into a swinging or vibrating link and permits the sections of the elliptical spring to have a reciprocating movement relative to one another.

In the drawings the single section A is mounted on the axle and the double section A' A' has a reciprocating movement relative to the lower section. The ear $a'$ can be of any suitable length to give the required movement, the length of the link being the distance between the pivots of the respective sections of the spring.

It is manifest that by the construction shown I am able to provide for the required reciprocating movement necessary to avoid horse motion in road-carts or the class encountered in the use of rigid spring connections in vehicles of all kinds. Of course the double section may be the lower one and the single section the upper one, if desired.

What I claim is—

A spring consisting of three semi-elliptical springs, two arranged parallel and apart and the other curved in a direction opposite to and its ends extending up between and above the other springs, hinged connections between the ends of the springs, consisting of a cross-bar having upturned ends and two vertical ears between the ends extending above the same, a bolt passing through the ends of the lower parts of the ears and through the eyes on the ends of the upper springs, and a bolt passing through the upper ends of the ears and the eye on the single lower spring, substantially as described.

In testimony whereof I sign this specification in the presence of two witnesses.

WILLIAM D. RUMSEY.

Witnesses:
MARION A. REEVE,
DELL J. BROWNE.